United States Patent

[11] 3,598,392

| [72] | Inventors | David T. N. Williamson;<br>Peter G. Davis, both of Deptford, London, England |
|---|---|---|
| [21] | Appl. No. | 752,390 |
| [22] | Filed | Aug. 13, 1968 |
| [45] | Patented | Aug. 10, 1971 |
| [73] | Assignee | Molins Machine Company Limited<br>London, England |
| [32] | Priority | Aug. 22, 1967 |
| [33] | | Great Britain |
| [31] | | 38,579/67 |

[54] FIXING DEVICES
2 Claims, 6 Drawing Figs.

[52] U.S. Cl. .................................................. 269/47,
287/103 A, 269/296
[51] Int. Cl. ........................................................ B23q 3/06
[50] Field of Search .......................................... 269/47,
48.1, 53, 296, 309—314; 279/7, 99, 104, 1 K, 2;
287/103 A; 85/32, 1; 10/10, 86, 152

[56] References Cited
UNITED STATES PATENTS

| 1,244,992 | 10/1917 | Lee .............................. | 85/68 |
| 1,273,379 | 7/1918 | Knudson ..................... | 279/104 |
| 1,806,887 | 5/1931 | Bruno .......................... | 269/53 |
| 2,944,838 | 7/1960 | Nardon ....................... | 269/47 X |
| 1,375,876 | 4/1921 | Ware ........................... | 269/101 X |
| 3,359,581 | 12/1967 | Senediak ..................... | 10/10 |

Primary Examiner—Andrew R. Juhasz
Assistant Examiner—Donald D. Evenson
Attorneys—Emory L. Groff and Emory L. Groff, Jr.

ABSTRACT: A method and apparatus for securing a workpiece to a support by a fixing device having a portion of noncircular cross section capable of entering a hole of noncircular cross section in the workpiece and rotatable to grip against a sidewall of the hole or recess. The fixing device is retained by, and may be mounted in, the support which may be fixed to a pallet.

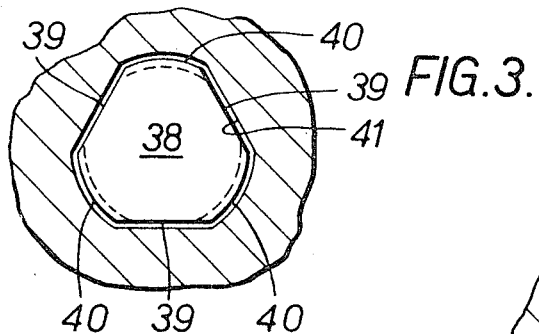
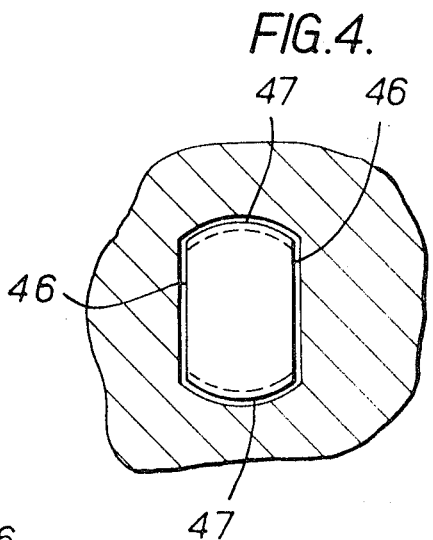
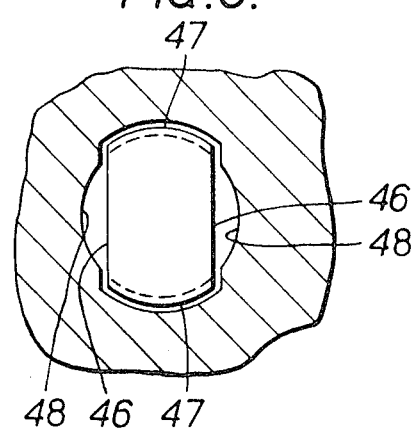
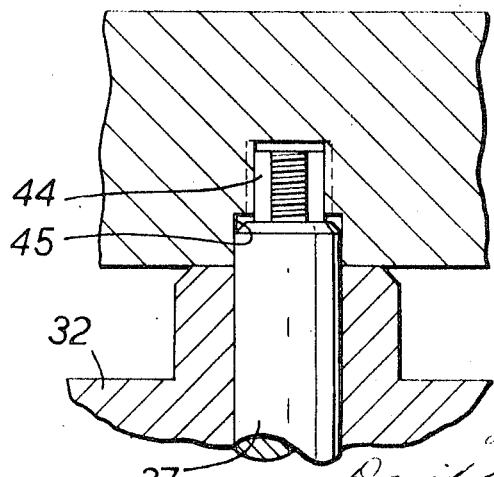

3,598,392

FIXING DEVICES

This invention relates to improvements in fixing devices for securing workpieces for machining operations.

In U.S. Application Ser. No. 718,887 there is disclosed a device for fixing a workpiece to a support element comprising a member having an external screw thread and an internal hexagonal recess in which a key can be inserted to rotate the member, the member being fitted in the support element and a spring being provided to urge the member to project from the support element. By this device the member can be fitted in the support element from one side thereof and screwed into a workpiece, to be fixed to the opposite side of the support element when the one side is inaccessible, by insertion of a key through a tapped fixing hole through the workpiece and into the recess to rotate the member so that it threads into the hole in the workpiece, thereby securing the workpiece to the support element.

According to the present invention there is provided a method of securing a workpiece to a support comprising the steps of providing in the workpiece a hole, of noncircular cross section, inserting in the hole a member retained by the support, the member being of noncircular cross section and adapted readily to enter the hole, and rotating said member to cause it to grip against said sidewall of the hole by interference therewith.

Further, according to the present invention there is provided a fixing device for securing a workpiece to a support comprising a member to be retained by the support, the member having a portion of noncircular cross section to interfere with and thereby grip against a sidewall of a hole in the workpiece when the member is rotated therein.

The invention further provides a support device for a workpiece comprising a support, a rotatable member mounted in and retained by the support and having a portion of noncircular cross section adapted on rotation when entered into a hole in the workpiece of suitable cross section to interfere with and thereby grip against a sidewall of the hole.

Still further, the invention provides a workpiece having a hole, of noncircular cross section, a support to which the workpiece is secured, a rotatable member mounted in and retained by the support and having a portion of noncircular cross section such that it can readily enter the hole, the portion being located in the hole, and further being so oriented relative to the hole that it is in interference with and thereby grips against a side wall of the hole.

The aforementioned member preferably has externally threaded portions adapted to interfere with and partially tap, as by swagging the sidewall of the hole on rotation. The support may house operable means adapted to receive an element, such as a key, and to be operated thereby to effect rotation of the member. The support may be fixed to a pallet to which the workpiece is to be secured.

The hole provided in the workpiece may be a blind hole or a through hole.

Fixing devices in accordance with the invention will now be described, by way of example, with reference to the accompanying drawings, in which:

FIG. 3 is a plan view, partly in section of a detail of FIG. 1,

FIGS. 4 and 5 show different shapes of holes in a workpiece and parts of cooperating fixing devices, and FIG. 6 is a section through a workpiece and fixing device.

Figure 1:
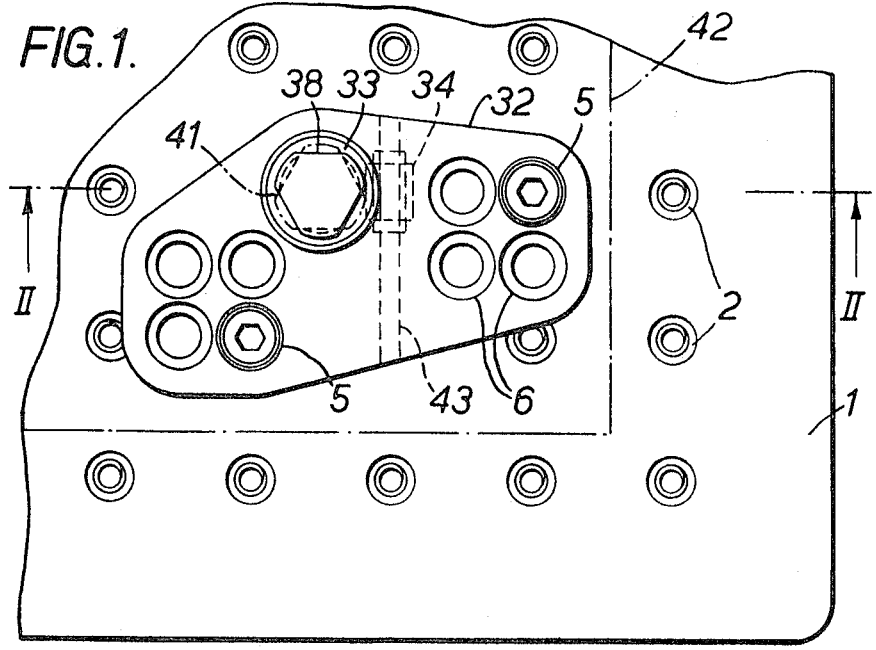
FIG. 1 is a plan view of part of a pallet having a support fixed thereto and with a workpiece, shown in broken line, fixed to the support.

FIG. 1 shows a pallet 1 having tapped holes 2 arranged at the junctions of a square grid, and having a support 32 fixed to the pallet by means of screws 5 passing through holes 6 in the support and threaded into tapped holes 2, as described in the aforementioned application.

The support 32 has a single raised support surface 33. The support 32 houses a worm 34, rotatable about a horizontal axis and with a central hexagonal keyway 35, and whose thread meshes with a worm wheel 36, rotatable about a vertical axis. A member 37 is secured to the worm wheel for rotation therewith and projects vertically through the support surface 33. The member 37 has a head 38 of noncircular cross section, the actual shape being best shown in FIG. 3. The head 38 has three equispaced flats 39 between which there are arcuate parts 40 having external screw threads; in other words it can be considered as an externally threaded screw originally of circular cross section but on which the flats 39 have been ground.

The head 38 is adapted readily to enter, without rotation, a noncircular plain (i.e. not threaded) blind hole 41 provided at the desired position in a workpiece 42 to be secured to the support. The hole 41 is slightly larger but of the same shape as the head 38, as can be seen from FIG. 3. Thus the workpiece can be placed on the support surface 33 so that the blind hole 41 registers with the head 38, the latter being oriented to fit and enter the hole in the manner illustrated in FIG. 3. The head 38 can then be rotated by insertion of a key having a hexagonal head through an access hole 43 in the support 32, so that the key's head engages in the keyway 35. As the head 38 rotates in the hole 41 the threaded parts 40 interfere with the sidewalls of the hole and cut into these walls to effect partial tapping of the hole e.g. as by swagging. The head 38 is thus rotated through 60° until it occupies the position shown in FIGS. 1 and 2 at which, due to this tapping action, the workpiece is securely held to the support.

The workpiece can be released from the support by use of the key to rotate the head 38 through 60°, either in the same direction as previously or in the opposite direction, to reorient the head with the hole, whereby the workpiece can simply be lifted from the support.

Figure 2:
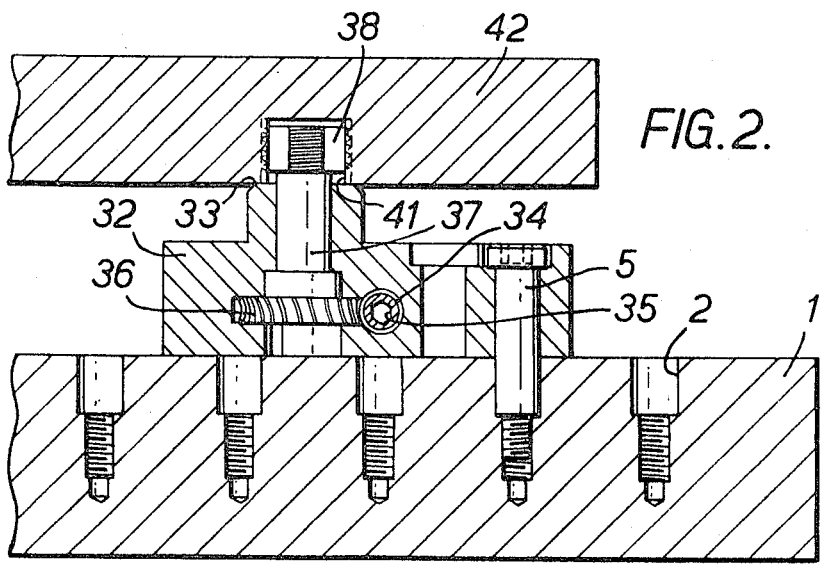
FIG. 2 is a section on the line II-II of FIG. 1.

If desired, the member 37 instead of having a head 38 of larger diameter than the member as shown in FIG. 2 may have a head 44 of smaller diameter as shown in FIG. 6, the hole in the workpiece then having an inner part shaped as described above to fit the head 44, and an outer (lower as viewed in FIG. 6) part 45 of circular cross section adapted to fit over the projecting circular portion of the member 37 to facilitate location of the workpiece on the member.

It will be appreciated that the shape shown in FIG. 3 of the head 38 and the hole 41 is given only by way of illustration and example and that any other suitable shape for either the head or the hole may be used. The shape of the hole need not necessarily be the same as that of the head, the requirement being simply that the head should readily enter the hole and on rotation, when entered into the hole, should interfere with the sidewalls of the hole.

A further example of a possible shape of head and hole is shown in principle in FIG. 4, where the head has two flats 46 and two arcuate externally threaded parts 47, the hole being shown as having the same shape as the head. In practice the hole for this shape of head preferably has arcuate incuts 48 as shown in FIG. 5 to accommodate the inner diameter of the threaded parts 47. Similar arcuate incuts could be provided for the shape shown in FIG. 3.

As described above the workpiece is provided with a blind hole, i.e. a hole extending only part way through the workpiece, at least part of which is of noncircular cross section for securing the workpiece to the support. If desired, however, the workpiece may be provided with a through hole, i.e. a hole extending right through the workpiece, of noncircular cross section, or having a part of noncircular cross section, and be secured to the support in the same manner. In this case, instead of the worm and worm wheel arrangement described above, the rotatable member 37 may be provided with a hexagonal recess or keyway in its head so that a key can be inserted through the hole in the workpiece to rotate the member, in a manner essentially as described in the aforementioned application.

It will be appreciated that the support 32 is shown only by way of illustration and example and that a fixing device as described may be used in any suitable form of support, for example in supports of the various forms described in the aforementioned patent application. Further, a plurality of such fixing devices may, if desired, be provided in one support.

We claim:

1. A support device for holding a workpiece for the workpiece to be machined, and comprising a body portion having means for securing it to a baseplate, a rotatable member retained in the body portion and having a threaded rodlike part protruding therefrom, means in the body portion to rotate the rotatable member, the rodlike part having a circular cross section with at least two regularly disposed cut away portions, the rodlike part being adapted for entry into a suitable similarly shaped slightly larger hole in the workpiece and on rotational movement to cut threads in the wall of the hole and jam itself in the hole.

2. A support device for holding a workpiece for the workpiece to be machined, and comprising a body portion having means for securing it to a baseplate, a rotatable member retained in the body portion and having a threaded rodlike part protruding therefrom, means in the body portion to rotate the rotatable member, the rodlike part having a circular cross section with at least two regularly disposed cut away portions, the rodlike part being adapted for entry into a suitable similarly shaped slightly larger hole in the workpiece and on rotational movement to cut threads in the wall of the hole and jam itself in the hole, said means to rotate the rotatable member including a worm wheel secured to the rotatable member, a worm mounted in the support device and in engagement with the worm wheel, the worm receiving a key member by which it may be rotated.